(12) United States Patent
Shiota et al.

(10) Patent No.: US 8,058,739 B2
(45) Date of Patent: Nov. 15, 2011

(54) MAIN CIRCUIT OF ELECTRIC POWER GENERATING APPARATUS FOR DISPERSED POWER SUPPLY

(75) Inventors: Takashi Shiota, Yokohama (JP); Keita Tanaka, Yokohama (JP); Tsutomu Isaka, Yokohama (JP)

(73) Assignee: Toyo Electric Mfg. Co., Ltd., Tokyo (JP)

( * ) Notice: Subject to any disclaimer, the term of this patent is extended or adjusted under 35 U.S.C. 154(b) by 435 days.

(21) Appl. No.: 11/992,448

(22) PCT Filed: Sep. 15, 2006

(86) PCT No.: PCT/JP2006/318419
§ 371 (c)(1),
(2), (4) Date: Mar. 21, 2008

(87) PCT Pub. No.: WO2007/037140
PCT Pub. Date: Apr. 5, 2007

(65) Prior Publication Data
US 2009/0243294 A1  Oct. 1, 2009

(30) Foreign Application Priority Data

Sep. 28, 2005 (JP) .................................. 2005-281054

(51) Int. Cl.
*F03B 13/00* (2006.01)
*F03B 13/10* (2006.01)
*H02P 9/04* (2006.01)
*H02M 3/18* (2006.01)

(52) U.S. Cl. ............... 290/43; 290/44; 363/61; 363/126

(58) Field of Classification Search ................ 290/43, 290/44; 363/61, 126
See application file for complete search history.

(56) References Cited

U.S. PATENT DOCUMENTS

| 3,001,120 | A | * | 9/1961 | Bereskin | 363/126 |
| 3,543,136 | A | * | 11/1970 | Enge | 363/61 |
| 3,596,167 | A | * | 7/1971 | Enge | 363/61 |
| 4,412,278 | A | * | 10/1983 | Cambier et al. | 363/126 |

(Continued)

FOREIGN PATENT DOCUMENTS

| EP | 1677412 A1 * | 7/2006 |
| JP | 2002-084795 | 3/2002 |
| JP | 2004-064928 | 2/2004 |

(Continued)

*Primary Examiner* — Pedro J Cuevas
(74) *Attorney, Agent, or Firm* — Chapman and Cutler LLP

(57) ABSTRACT

In an electric power generating apparatus for dispersed power supply using a permanent magnet type electric power generator having many kinds of windings in order to obtain the maximum output by force of wind without using PWM converter, there is a problem that gap magnetic flux of the permanent magnet type electric power generator is demagnetized to decrease the internal induced voltage because alternating current output of the permanent magnet type electric power generator is lagging current. In an electric power generating apparatus for dispersed power supply including a permanent magnet type electric power generator having a plurality of windings inducing different effective values of induced voltages and individual rectifiers for rectifying alternating current outputs of the permanent magnet type electric power generator, a capacitor is connected in series between the individual rectifier and the alternating current output terminal of the winding inducing higher effective value of induced voltage among the plurality of windings in a manner that serial impedances of the capacitor and the permanent magnet type electric power generator become capacitive within the range of rated rotational speed of said permanent magnet type electric power generator.

2 Claims, 7 Drawing Sheets

U.S. PATENT DOCUMENTS

| | | | | |
|---|---|---|---|---|
| 4,752,751 | A | * | 6/1988 | Walker ........................... 333/175 |
| 4,841,429 | A | * | 6/1989 | McClanahan et al. ........ 363/126 |
| 5,162,963 | A | * | 11/1992 | Washburn et al. .............. 361/18 |
| 7,489,047 | B2 | * | 2/2009 | Shiota ............................. 290/44 |
| 2007/0040386 | A1 | | 2/2007 | Shiota ............................. 290/44 |
| 2009/0236916 | A1 | * | 9/2009 | Nishimura ...................... 307/80 |

FOREIGN PATENT DOCUMENTS

| | | |
|---|---|---|
| JP | 2005-110474 | 4/2005 |
| WO | WO 2005034334 A1 * | 4/2005 |

* cited by examiner

MAIN CIRCUIT OF ELECTRIC POWER GENERATING APPARATUS FOR DISPERSED POWER SUPPLY

TECHNICAL FIELD

This invention relates to a main circuit of an electric power generating apparatus for dispersed power supply, which derives from a permanent magnet type electric power generator driven by a windmill or waterwheel substantially maximum output obtained by wind or water irrespective of wind or water speed, and more particularly to a main circuit of an electric power generating apparatus for dispersed power supply for performing constant voltage charge from a permanent magnet type electric power generator without using a PWM converter.

BACKGROUND ART

In order to obtain the approximately or substantially maximum output from a permanent magnet type electric power generator connected to a windmill or waterwheel by converting alternating current to direct current without using a PWM converter, the applicant of the present application had proposed an electric power generating apparatus for dispersed power supply comprising a permanent magnet type electric power generator including a plurality of windings inducing different induced voltages and having alternating current output terminals each connected in series through a reactor to a rectifier, and the direct current outputs of these rectifiers being connected in parallel to one another, thereby outputting the direct current external (refer to, for example opened Japanese Patent Literature 1).

Such a prior art technique will be explained in detail with reference to a main circuit diagram illustrating an electric power generating apparatus for dispersed power supply connected to a windmill shown in FIG. 13.

In FIG. 13, a windmill is denoted by reference numeral 1 and an electric power generating apparatus for dispersed power supply of the prior art is denoted by reference numeral 2 comprising a permanent magnet type electric power generator 3, first and second reactors 4 and 5, first and second rectifiers 7 and 8, a positive output terminal 11 and a negative output terminal 12. Reference numeral 13 denotes a battery.

The permanent magnet type electric power generator 3 in FIG. 13 has two kinds of windings and of a three-phase generator.

In the permanent magnet type electric power generator 3 in FIG. 13, connected to the first reactor 4 and further to the first rectifier 7 is the alternating current output terminal W1 of a first winding whose effective value of induced voltage is low due to its smaller number of turns.

Connected to the second reactor 5 and further to the second rectifier 8 is the alternating current output terminal W2 of a second winding having a larger number of turns.

The direct current outputs of the first and second rectifiers 7 and 8 are connected in parallel to the positive output terminal 11 and the negative output terminal 12, and the total output of the respective windings is stored into the battery 13.

A method for obtaining the substantially maximum output from the electric power generating apparatus 2 for dispersed power supply thus configured will be described hereinafter.

FIG. 12 is a diagram for explaining the outline of the number of revolutions of the windmill versus output characteristic when wind speed is taken as the parameter.

With a windmill, if the shape of the windmill and wind speed U are determined, the output P of the windmill is monolithically determined with respect to the number of revolutions N of the windmill. For example, the output P of the windmill for the wind speeds Ux and Uy is illustrated as in FIG. 12, respectively. Peak values of the outputs P of the windmill for various wind speeds are shown as the maximum output curve Pt in FIG. 12.

In more detail, with the number of revolutions of the windmill versus output characteristic in FIG. 12, when the wind speed is Ux, the maximum output Px of the windmill is obtained at the number of revolutions Nx of the windmill as shown at the intersection point Sx of the windmill output curve at the wind speed Ux with the maximum output curve.

Moreover, when the wind speed is Uy, the maximum output Py of the windmill at the wind speed Uy is obtained at the number of revolutions Ny of the windmill.

Namely, when viewing the maximum output curve in FIG. 12 from another point, this curve indicates the fact that in order to obtain the maximum output from the wind, upon the number of revolutions N of the windmill being determined, the maximum output can be obtained by primarily determining the output P of the permanent magnet type electric power generator 3 at a value on the maximum output curve Pt.

FIG. 11 is an explanatory view when the direct current outputs of the electric power generating apparatus 2 for dispersed power supply of the prior art are connected to a constant voltage power supply such as a battery or the like. As shown in FIG. 11, respective outputs of the first and second windings of the permanent magnet type electric power generator 3 of the electric power generating apparatus 2 for dispersed power supply are shown as the number of revolutions of windmill versus output characteristic curves P1 and P2 owing to difference in the effective values of induced voltages of the windings and voltage drops caused by internal inductances of the respective windings and the reactors connected to the respective output terminals.

In other words, when the number of revolutions N of the windmill is low, the battery 13 is not charged because the induced voltages of the first and second windings in the permanent magnet type electric power generator 3 are lower than the battery voltage Vb.

However, when the number of revolutions N of the windmill increases to a value near to N2, the electric current starts to flow through the second winding. With increase in number of revolutions N of the windmill, the electric current increases so that the output of the second winding is as shown at P2.

At this time, even if the number of revolutions N of the windmill increase to cause the induced voltage to be increased, the voltage of the battery remains at substantially constant value. On the other hand, the output P2 only gradually increases because the inductance of the second winding and the inductance by the second reactor 5 are proportional to the frequency.

With the first winding, when the number of revolutions N is further increased, the output starts to be obtained and greater output can be obtained because the internal inductance of the first winding and inductance of first reactor 4 are both small.

FIG. 10 illustrates the output to a constant voltage power supply such as a battery of the electric power generating apparatus for dispersed power supply of the prior art.

A total output obtained by summing up the outputs P1 and P2 of the first and second windings in the permanent magnet type electric power generator 3 is shown by an approximate output curve Ps.

Patent Literature 1: Japanese Patent Application Opened No. 2004-64,928 (FIG. 1)

DISCLOSURE OF THE INVENTION

Task to be Solved by the Invention

When electric power is obtained from the main circuit of the electric power generating apparatus 2 for dispersed power supply configured as described above, the alternating current output of the windings of the permanent magnet type electric power generator 3 is lagging current so that there is a tendency of gap magnetic flux of the permanent magnet type electric power generator 3 to be decreased. Therefore, this tendency would become an important cause for reducing the internal induced voltage, thereby decreasing the output of the electric power generating apparatus 2 for dispersed power supply.

Particularly, the second winding having the larger number of turns will be greatly affected by the influence of flux reducing effect which is in proportion to the product of lagging current and the number of turns of the winding owing to the large number of turns although the current flowing through the second winding is small, while the first winding cannot output a large alternating current because of its small number of turns.

Viewing the influence of the flux reducing or demagnetizing effect with respect to the output to the constant voltage power supply such as the battery of the electric power generating apparatus 2 for dispersed power supply of the prior art in FIG. 10, it is clear that the difference Pz between the maximum output curve Pt and the approximate output curve Ps becomes great when the number of revolutions N of the windmill is large.

In order to mitigate the flux reducing or demagnetizing effect, for example, it may be needed to increase the thickness of the permanent magnets in the direction of magnetic flux in the permanent magnet type electric power generator 3.

The invention has been completed in view of the circumstances described above. The principal object of the invention is to provide a main circuit of an electric power generating apparatus for dispersed power supply, which enables the price of the permanent magnet type electric power generator 3 to be reduced by decreasing the amounts of expensive permanent magnets in the permanent magnet type electric power generator 3 and enables a maximum output curve Pt and an approximate output curve Ps to substantially coincide with each other, even when the number of revolutions N of the windmill is great.

Solution for the Task

Therefore, in a main circuit of an electric power generating apparatus for dispersed power supply including a permanent magnet type electric power generator driven by a windmill or waterwheel and having a plurality of windings inducing different effective values of induced voltages, alternating current outputs of which permanent magnet type electric power generator are rectified by individual rectifiers whose direct current outputs are summed up to output to the external, according to the invention a capacitor is connected in series between the individual rectifier and an alternating current output terminal of the winding inducing high effective value of induced voltage among the plurality of windings.

Effect of the Invention

The invention can provide a main circuit of an electric power generating apparatus for dispersed power supply, which enables the price of the permanent magnet type electric power generator 3 to be reduced by decreasing amounts of expensive permanent magnets in the permanent magnet type electric power generator 3 and enables a maximum output curve Pt and an approximate output curve Ps to substantially coincide with each other.

BRIEF DESCRIPTION OF THE DRAWINGS

FIG. 5 is a diagram for explaining the output of the electric power generating apparatus for dispersed power supply of the invention to a constant voltage power supply such as a battery or the like;

FIG. 10 is a diagram for explaining the output of the electric power generating apparatus for dispersed power supply of the prior art to a constant voltage power supply such as a battery or the like;

DESCRIPTION OF THE REFERENCE NUMERALS

Figure 1:
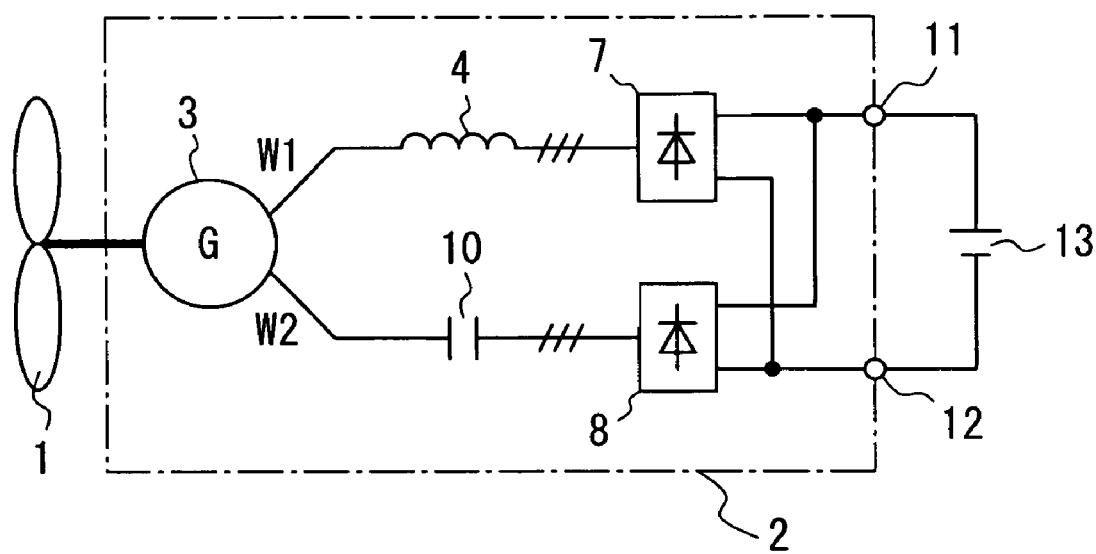
FIG. 1 is a view for explaining the main circuit of an electrical power generating apparatus for dispersed power supply driven by a windmill according to the invention.

1 Windmill
2 Electric power generating apparatus for dispersed power supply
3 Permanent magnet type electric power generator
4, 5, 6 First, second and third reactors
7, 8, 9 First, second and third rectifiers
10 Capacitor
11 Positive output terminal
12 Negative output terminal
13 Battery

BEST MODE FOR CARRYING OUT THE INVENTION

In a main circuit of an electric power generating apparatus for dispersed power supply including a permanent magnet type electric power generator having a plurality of windings inducing different effective values of induced voltages, alternating current outputs of which electric power generator are rectified by individual rectifiers whose direct current outputs are summed up to output to external, according to the invention a capacitor is connected in series between the rectifier and the alternating current output terminal of the winding inducing the high effective value of induced voltage among the plurality of the windings in a manner that the serial sum of inductive impedance by the internal inductance of the permanent magnet type electric power generator and capacitive impedance by the capacitor becomes capacitive impedance within the range of rated rotational speed of said permanent magnet type electric power generator.

Embodiment 1

FIG. 1 is a view for explaining the main circuit of the electric power generating apparatus for dispersed power supply driven by a windmill or waterwheel to obtain direct current output according to the invention.

Figure 13:
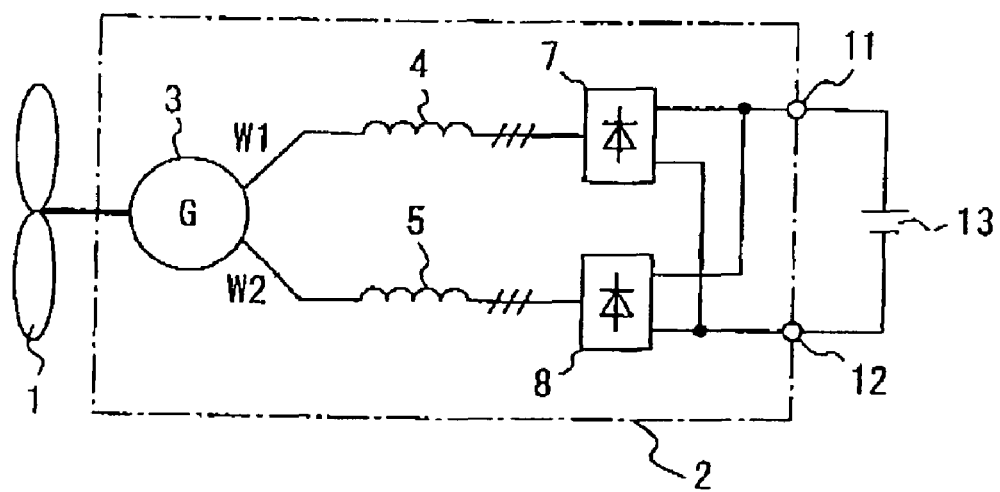
FIG. 13 is a main circuit diagram of the electric power generating apparatus for dispersed power supply of the prior art.

In FIG. 1, reference numeral 10 denotes a capacitor, and the same components as those in FIG. 13 are identified by the same reference numerals as those used in FIG. 13. The main circuit of the electric power generating apparatus according to the invention will be explained hereinafter with reference to FIG. 1 and further FIGS. 5 and 6 explaining the principle of the invention.

A capacitor 10 and further a second rectifier 8 are connected in series to the alternating current output terminal W2 of a second winding having a larger number of turns. A first reactor 4 and further a first rectifier 7 are connected in series to the alternating current output terminal W1 of a first winding having a smaller number of turns.

The outputs of the first and second rectifiers 7 and 8 are connected in parallel to each other, and a battery 13 is charged with the total direct current output of the first and second rectifiers.

Now, the capacitor 10 is designed on the basis of the internal inductance of the second winding in said permanent magnet type electric power generator 3 in a manner that the internal inductance of the second winding and the serial impedance of the capacitor 10 become capacitive impedance within the range of rated rotational speed of said permanent magnet type electric power generator 3.

With such designing, the second winding allows alternating current to flow, which is obtained by vectorially summing up the effective current for the battery 13 and phase advance current owing to the capacitive impedance.

When the number of revolutions N of the windmill is low, the battery 13 is not charged because the induced voltage of the second winding is lower than the battery voltage Vb.

However, when the number of revolutions N of the windmill increases to a value near to N2, the electric current starts to flow so that the output of the second winding becomes P2.

With increase in the number of revolutions N of the windmill, that is, with increase in frequency of the permanent magnet type electric power generator 3, the internal inductance of the second winding and the serial impedance of the capacitor 10 will be reduced. Therefore, the alternating current output by means of the second winding increases substantially in proportion to square of frequency, in conjunction with increase in the induced voltage.

Because the phase advance current flows through the second winding, moreover, there is a tendency for gap magnetic flux of the permanent magnet type electric power generator 3 to be magnetized so that the internal induced voltages of the first and second windings increase.

Figure 6:
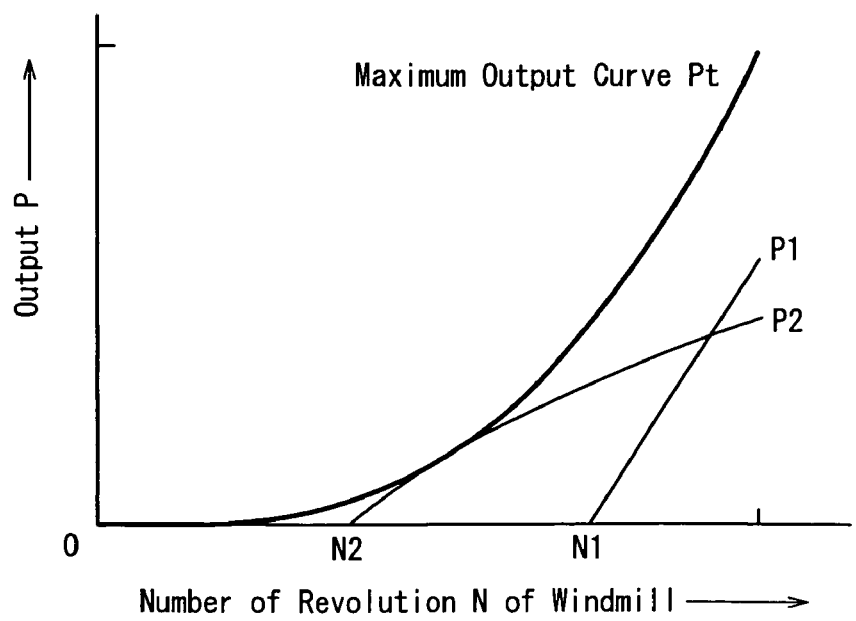
FIG. 6 is a diagram for explaining outputs of the respective windings of the first embodiment according to the invention.

FIG. 6 is an explanatory view for the case that the direct current output of the electric power generating apparatus 2 for dispersed power supply according to the invention is connected to a constant voltage power supply such as a battery or the like. The respective outputs of the first and second windings of the permanent magnet type electric power generator 3 of the electric power generating apparatus 2 for dispersed power supply are shown as P1 and P2 of the number of revolutions of the windmill versus output characteristic curves of FIG. 6, owing to the difference in effective values of induced voltages of the respective windings and voltage drop due to the internal inductances of the respective windings and the reactor or capacitor connected to each of the output terminals.

Figure 5:
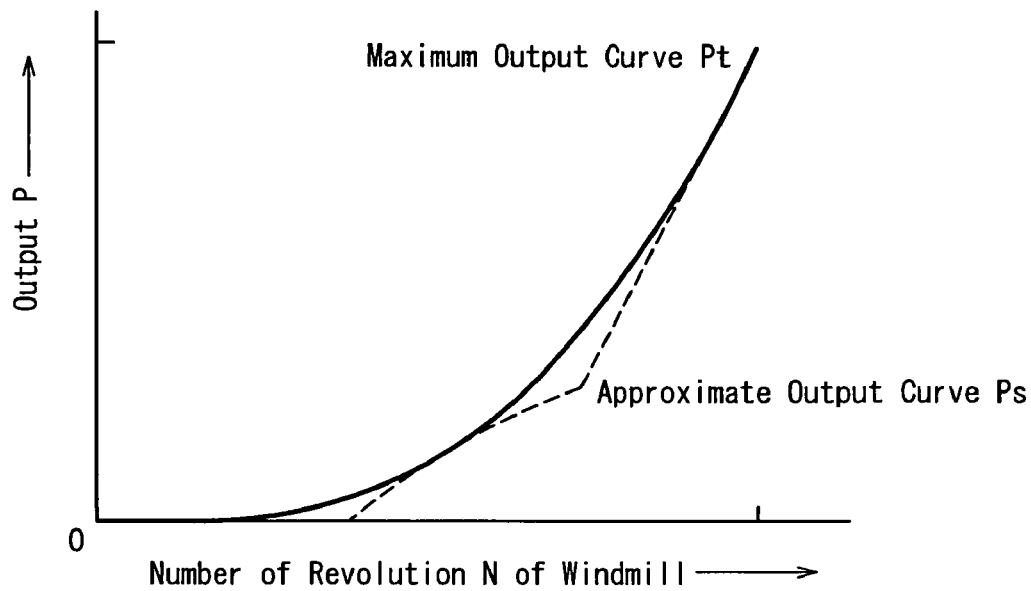

FIG. 5 is a view illustrating the output to the constant voltage power supply such as the battery or the like of the electric power generating apparatus 2 for dispersed power supply according to the invention.

When the number of revolutions N increases, the output of the first winding having the smaller internal inductance and the like starts to become larger.

Because the phase advance current flows through the second winding, now the internal induced voltage of the first winding increases. However, the magnetizing effect by the phase advance current of the second winding is restrained by demagnetizing effect due to lagging current of the first winding itself, with the increase in the current flowing through the first winding.

Figure 10:
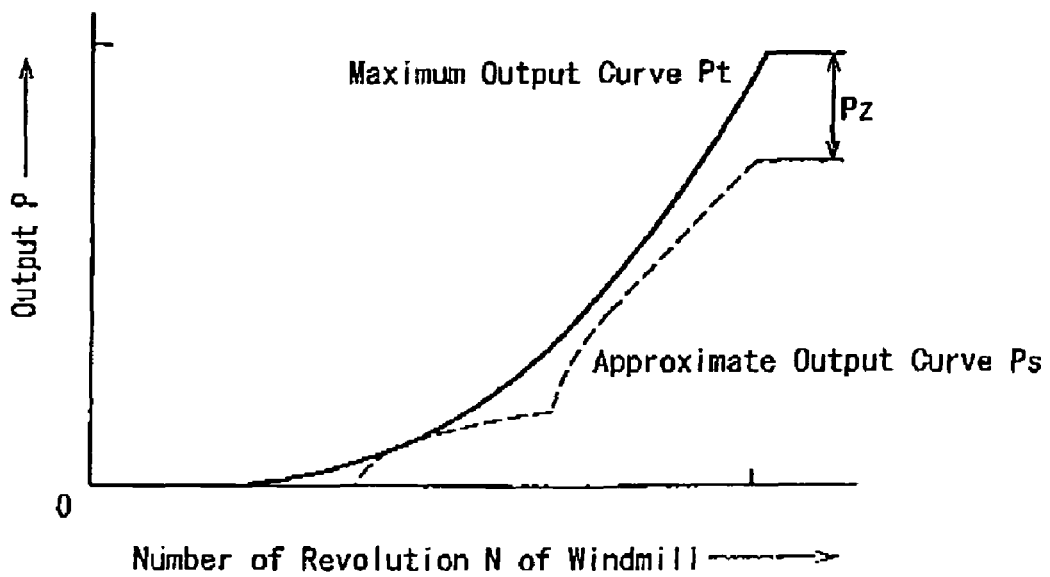
Figure 11:
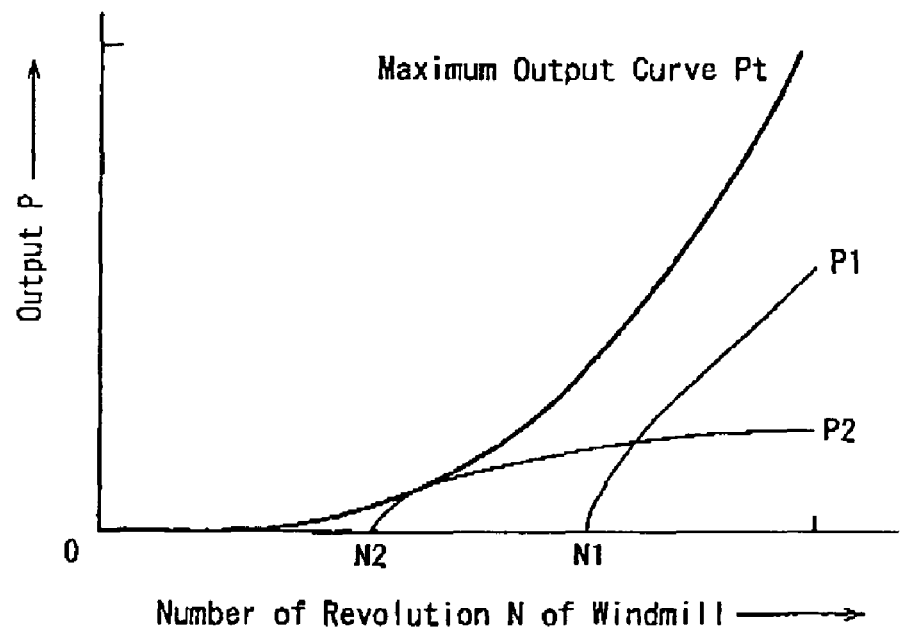
FIG. 11 is a diagram for explaining outputs of the respective windings of the electric power generating apparatus for dispersed power supply of the prior art.
Figure 12:
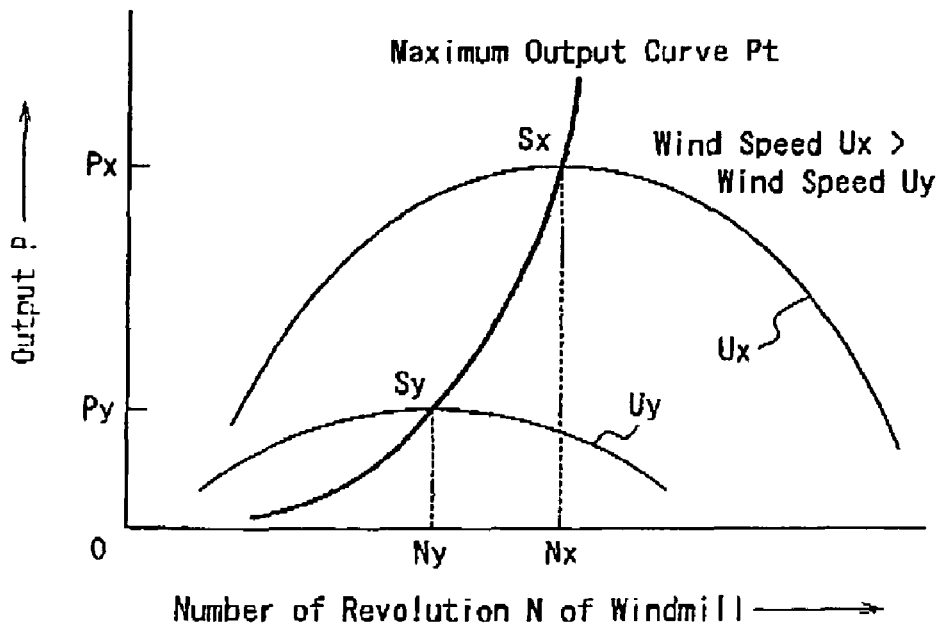
FIG. 12 is a diagram for explaining outline of the number of revolutions of the windmill versus output characteristics of the windmill with wind speeds as a parameter.

Accordingly, the total output obtained by summing up the outputs P1 and P2 becomes larger than the approximate output curve Ps of the prior art shown in FIG. 10 so that the output like an approximate output curve Ps shown in FIG. 5 can be obtained which is similar to the maximum output curve Pt.

Embodiment 2

Figure 2:
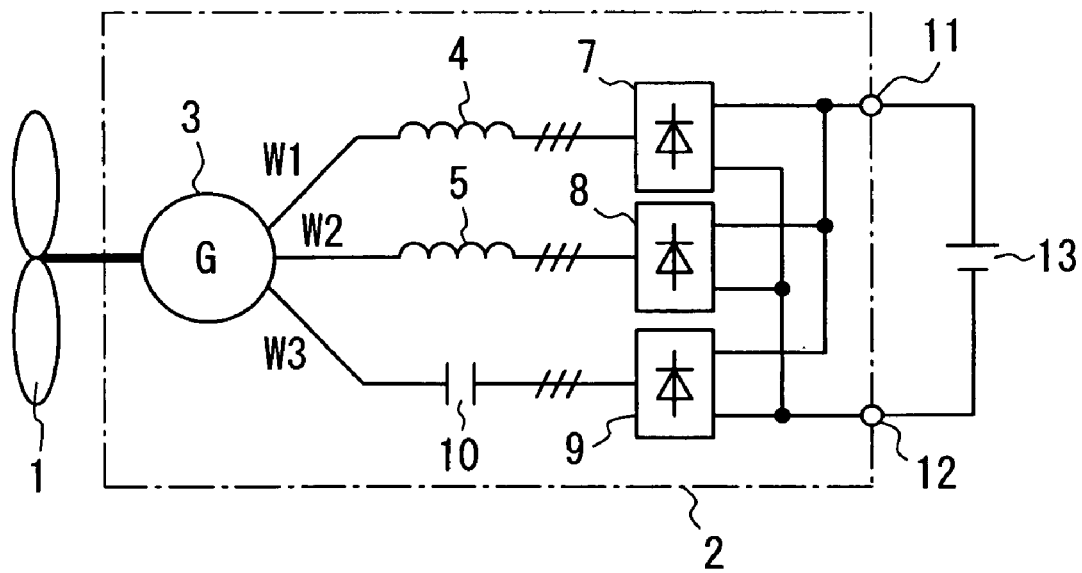
FIG. 2 is a main circuit diagram of an electric power generating apparatus for dispersed power supply for explaining the second embodiment of the invention in the case of the permanent magnet type electric power generator including three kinds of windings among which one winding has a largest number of turns to which the invention is applied.

FIG. 2 illustrates the second embodiment of the invention.

FIG. 2 is a view illustrating the main circuit of an electric power generating apparatus for dispersed power supply including a permanent magnet type electric power generator 3 having three kinds of windings among which one kind winding has the largest number of turns to which the present invention is applied.

In FIG. 2, reference numeral 9 denotes a third rectifier, and the same components as those in FIGS. 1 and 13 are identified by identical reference numerals.

The second embodiment of the invention will be described with reference to FIG. 2 hereinafter.

A capacitor 10 and further a third rectifier 9 are connected in series to the alternating current output terminal W3 of the third winding having the largest number of turns in the permanent magnet type electric power generator 3. A second reactor 5 and further a second rectifier 8 are connected in series to the alternating current output terminal W2 of the second winding having the second largest number of turns. A first reactor 4 and further a first rectifier 7 are connected in series to the alternating current output terminal W1 of the first winding having the smallest number of turns.

The outputs of the first to third rectifiers 7 to 9 are connected in parallel to one another, and a battery 13 is charged with the total direct current output of the first to third rectifiers.

In this case, the capacitor 10 is designed on the basis of the internal inductance of the winding in said permanent magnet type electric power generator 3 in a manner that the internal inductance of the third winding and the serial impedance of the capacitor 10 become capacitive impedance within the range of rated rotational speed of said permanent magnet type electric power generator 3.

With such designing, when the number of revolutions N of the windmill increases to cause the induced voltage of the third winding to be higher than the voltage Vb of the battery, the third winding allows alternating current to flow, which is obtained by vectorially summing up the effective current for the battery 13 and phase advance current owing to the capacitive impedance.

With the increase in the number of revolutions N of the windmill, that is, with the increase in frequency of the alternating current output of the permanent magnet type electric power generator 3, the internal inductance of the third winding and the serial impedance of the capacitor 10 will be decreased. Therefore, the alternating current output by means of the third winding increases substantially in proportion to square of frequency, in conjunction with the increase in the induced voltage of the third winding.

Because the third winding includes phase advance current, moreover, there is a tendency for gap magnetic flux of the permanent magnet type electric power generator 3 to be magnetized so that upon current flowing through the third winding, the internal induced voltages of the first to third windings increase.

However, the magnetizing effect by the phase advance current of the third winding is restrained by the demagnetizing effect due to lagging current of the first and second windings, with the increase in the currents of the first and second windings.

Figure 7:
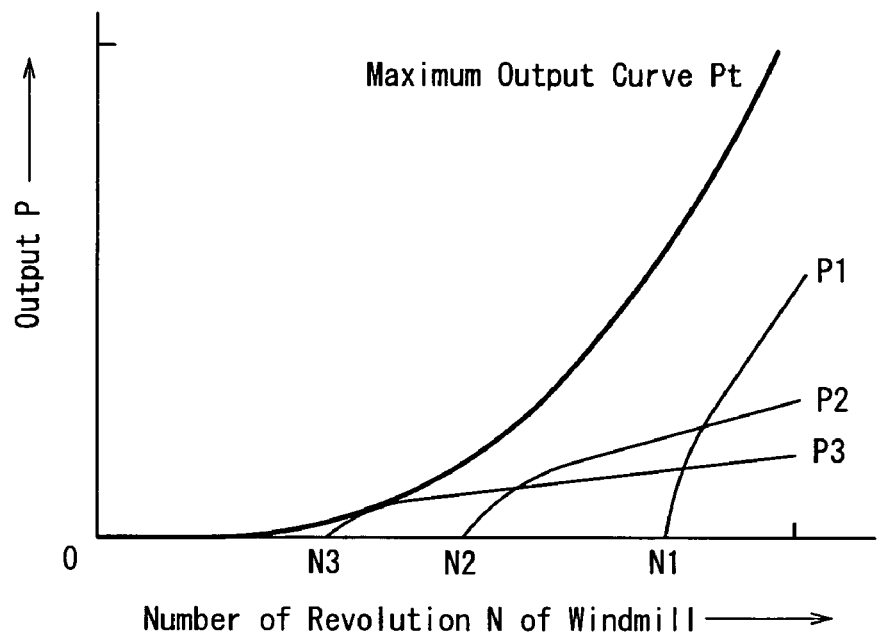
FIG. 7 is a diagram for explaining outputs of the respective windings of the second embodiment according to the invention.

FIG. 7 illustrates the outputs of the respective windings in the second embodiment of the invention. When the number of revolutions N of the windmill increases, the outputs of the respective windings are increased, particularly the output of the third winding being increased in inversely proportion to the number of revolutions N of the windmill or the frequency.

The total output obtained by summing up the outputs P1 to P3 of the first to third windings more approximates to the maximum output curve Pt than does the approximate output curve Ps in the case of the two windings shown in FIG. 5, because the permanent magnet type electric power generator 3 in this embodiment has the three kinds of windings.

Embodiment 3

Figure 3:
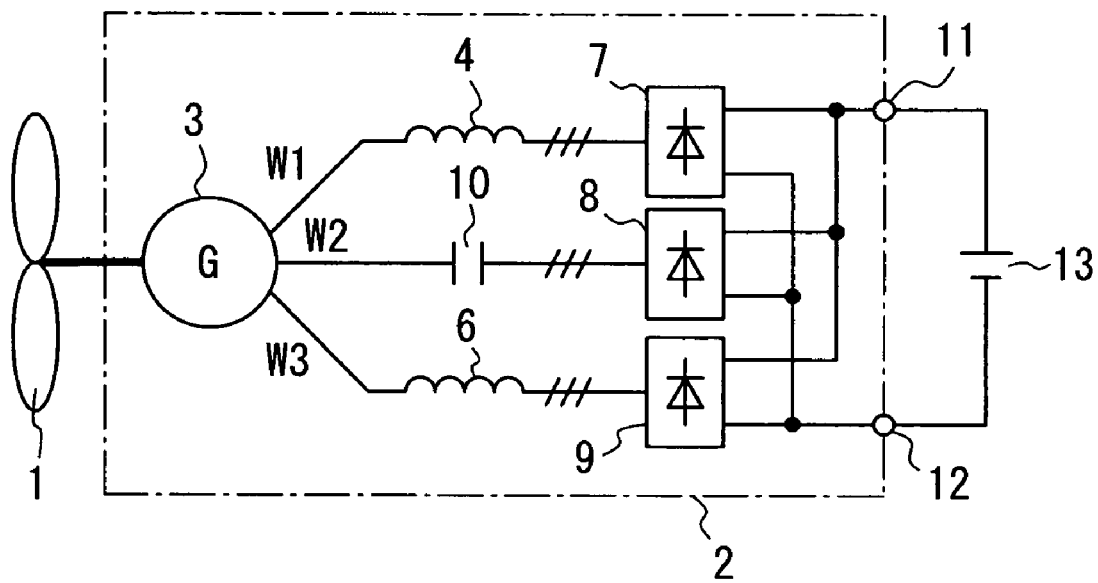
FIG. 3 is a main circuit diagram of an electric power generating apparatus for dispersed power supply for explaining the third embodiment of the invention in the case of the permanent magnet type electric power generator including three kinds of windings among which one winding has the second largest number of turns to which the invention is applied.

FIG. 3 illustrates the third embodiment of the invention.

FIG. 3 is a view illustrating the main circuit of an electric power generating apparatus 3 for dispersed power supply including a permanent magnet type electric power generator having three kinds of windings among which one kind winding has the second largest number of turns, to which the present invention is applied and whose alternating current output terminal has a capacitor connected thereto.

In FIG. 3, reference numeral 6 denotes a third reactor, and the same components as those in FIG. 2 are identified by identical reference numerals.

The third embodiment of the invention will be described with reference to FIG. 3 hereinafter.

A third reactor 6 and further a third rectifier 9 are connected in series to the alternating current output terminal W3 of the third winding having the largest number of turns.

A capacitor 10 and further a second rectifier 8 are then connected in series to the alternating current output terminal W2 of the second winding having the second largest number of turns.

A first reactor 4 and further a first rectifier 7 are connected in series to the alternating current output terminal W1 of the first winding having the smallest number of turns.

The outputs of the first to third rectifiers 7 to 9 are connected in parallel to one another, and a battery 13 is charged with the total direct current output of the first to third rectifiers.

In this case, the capacitor 10 is designed on the basis of the internal inductance of the winding in said permanent magnet type electric power generator 3 in a manner that the internal inductance of the second winding and the serial impedance of the capacitor 10 become capacitive impedance within the range of rated rotational speed of said permanent magnet type electric power generator 3.

With such designing, when the number of revolutions N of the windmill increases to cause the induced voltage of the second winding to be higher than the voltage Vb of the battery, the second winding allows phase advance current to flow.

Because the phase advance current flows through the second winding, moreover, there is a tendency for gap magnetic flux of the permanent magnet type electric power generator 3 to be magnetized so that when the number of revolutions of the windmill is increased to cause electric current to start to flow through the second winding, the internal induced voltages in the first to third winding will increase.

Figure 8:
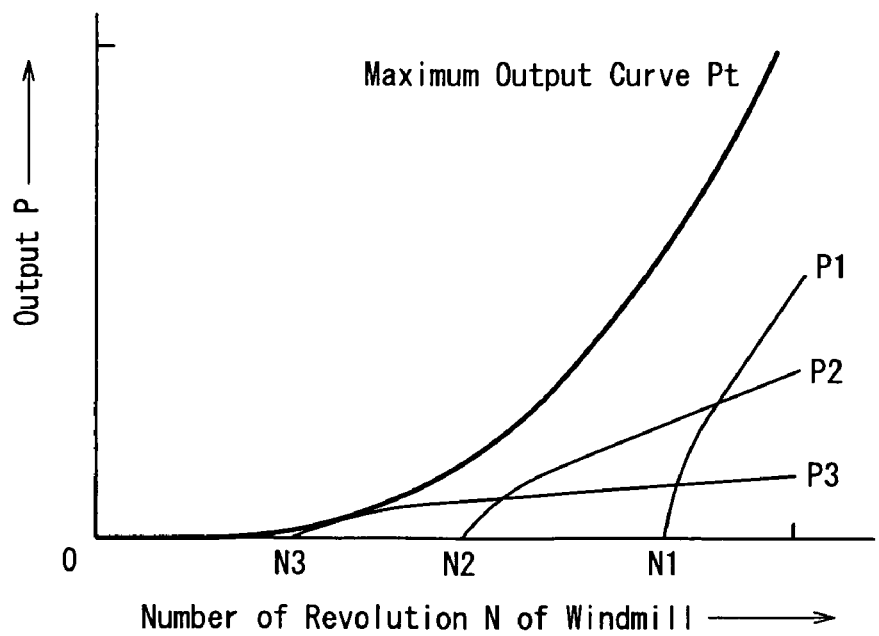
FIG. 8 is a diagram for explaining outputs of the respective windings of the third embodiment according to the invention.

FIG. 8 illustrates the outputs of the respective windings in the third embodiment of the invention. When the number of revolutions N of the windmill increases, the outputs of the respective windings are increased, particularly the output of the second windings being increased substantially in proportion to square of the number of revolutions N or frequency.

The total output obtained by summing up the outputs P1 to P3 of these first to third windings more approximates to the maximum output curve Pt than does the approximate output curve Ps shown in FIG. 5, because the permanent magnet type electric power generator 3 in this embodiment has the three kinds of windings.

However, the magnetizing effect by the phase advance current of the second winding is restrained by the demagnetizing effect due to lagging current of the first and third windings, with the increase in the currents of the first and third windings.

When the capacitor 10 is connected to the second windings having the second largest number of turns, much electric current flows through the capacitor 10 and the internal impedance of the second winding is small. However, this construction has an advantage that a small capacity of the capacitor 10 is enough to obtain the capacitive impedance within the rated rotational speed range, because the range of the number of revolutions N of the windmill requiring the flow of the phase advance current is narrow.

Embodiment 4

Figure 4:
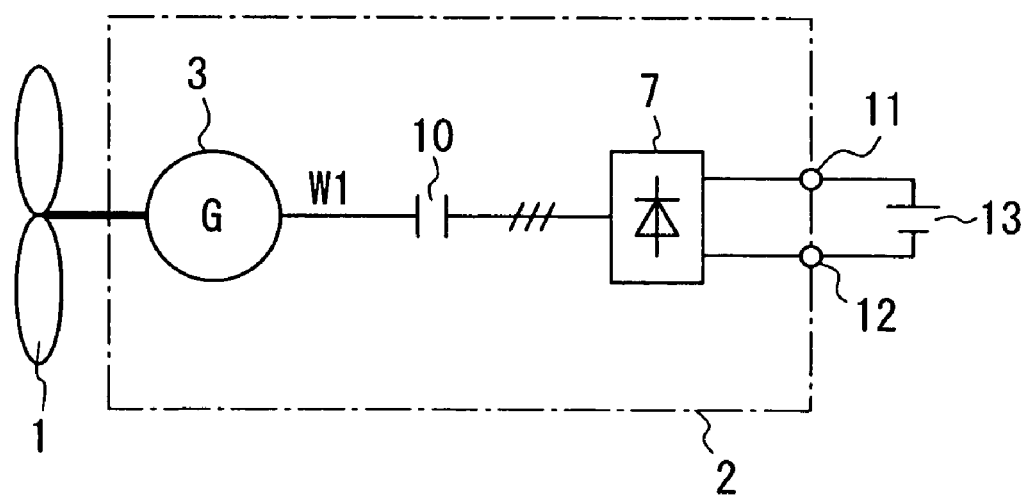
FIG. 4 is a main circuit diagram of an electric power generating apparatus for dispersed power supply for explaining the fourth embodiment of the invention in the case of the permanent magnet type electric power generator has one kind of winding to which the invention is applied.

FIG. 4 illustrates the fourth embodiment of the invention.

FIG. 4 is a view of a main circuit of an electric power generating apparatus for dispersed power supply including a permanent magnet type electric power generator 3 having only one kind of winding to which the invention is applied.

In FIG. 4, the same components as those in FIG. 1 are identified by identical reference numerals.

The fourth embodiment of the invention will be explained with reference to FIG. 4, hereinafter.

A capacitor 10 and further a first rectifier 7 are connected in series to the alternating current output terminal W1 of the first winding.

In this case, the capacitor 10 is designed on the basis of the internal inductance of the winding in said permanent magnet type electric power generator 3 in a manner that the internal inductance of the first winding and the serial impedance of the capacitor 10 become capacitive impedance within the range of rated rotational speed of said permanent magnet type electric power generator 3.

With such designing, when the number of revolutions N of the windmill increases to cause the induced voltage of the first winding to be higher than the voltage Vb of the battery, the first winding allows phase advance current and effective current to flow. The battery is charged with the effective current.

Accordingly, when the current starts to flow through the first winding, the internal induced voltage of the first winding will increase with the aid of the phase advance current.

Figure 9:
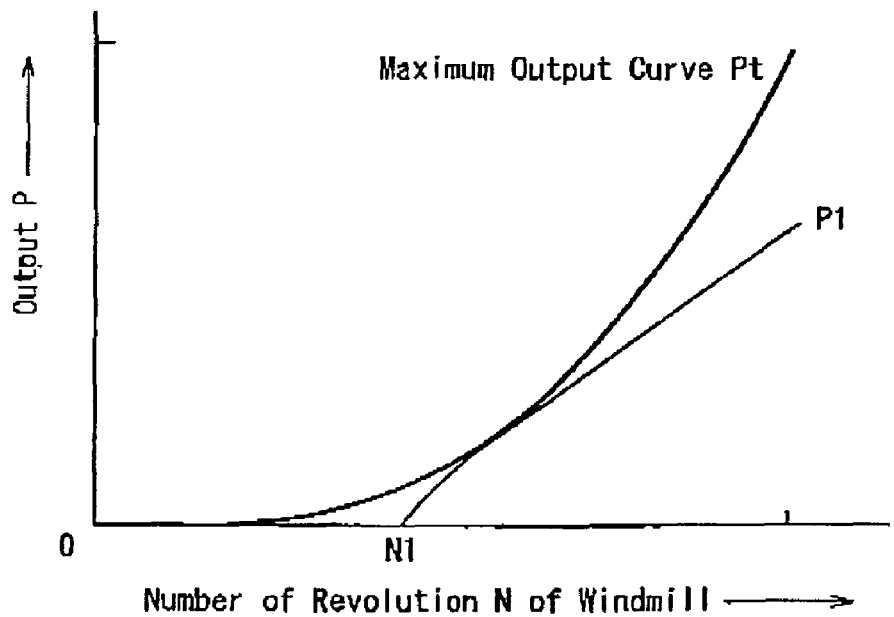
FIG. 9 is a diagram for explaining outputs of the winding of the fourth embodiment according to the invention.

FIG. 9 illustrates the output of the first winding in the fourth embodiment of the invention, wherein when the number of revolutions N of the windmill increases, the output will increase substantially in proportion to square of the number of revolutions N of the windmill or the frequency.

The output P1 of the first winding does not approximate to the maximum output curve Pt. However, because the gap magnetic flux of the permanent magnet type electric power generator 3 is magnetized, the output substantially similar to the maximum output curve Pt can be obtained in a simpler manner in comparison with the main circuit of an electric power generating apparatus for dispersed power supply of the prior art to which rectifiers only are connected.

INDUSTRIAL APPLICABILITY

According to the main circuit of the electric power generating apparatus for dispersed power supply of the invention, even if the number of revolutions N of the windmill is great, the approximate output curve Ps is caused to substantially coincide with the maximum output curve Pt, while the amount of the costly permanent magnets in the permanent magnet type electric power generator 3 can be reduced so that the price of the permanent magnet type electric power generator 3 is lowered.

Moreover, as there is the magnetizing effect of the windings of larger number of turns, even if the number of turns of the winding having smaller number of turns is reduced, a required induced voltage can be obtained so that the volume and weight of the permanent magnet type electric power generator 3 can be reduced owing to the decrease in windings and winding space. Therefore, the permanent magnet type electric power generator becomes lighter, and the case that the generator is enclosed in a nacelle of a propeller windmill, the whole nacelle becomes lighter, which is very useful from a practical standpoint.

According to the main circuit of the electric power generating apparatus for dispersed power supply of the invention, when the permanent magnet type electric power generator is operated at a rotational speed at which it is desired to obtain the maximum efficiency of the generator, all the copper loss or resistance loss of the permanent magnet type electric power generator can be minimized by optimizing the leading current or lagging current of each of the windings.

Moreover, when the internal inductance of the second winding resonates with the capacitor 10, the impedance becomes only resistance component so that large current flows therethrough. Therefore, if the capacity of the capacitor 10 is determined so as to cause the resonance state at the rotational speed of the permanent magnet type electric power generator 3 more than its rated rotational speed, an electric braking function can be obtained which gradually operates to stop the windmill as its rotational speed increases.

The main circuit of the electric power generating apparatus for dispersed power supply according to the invention does not require an anemometer and an expensive PWM converter and achieves reduction in permanent magnets in the permanent magnet type electric power generator, thereby enabling the apparatus to be inexpensively manufactured. Moreover, standby electric power required for the PWM converter is not needed so that production of electricity of the apparatus can be increased for the year. Accordingly, the apparatus of the invention is very useful from a practical standpoint.

While the capacitor is connected to the winding of the largest number of turns or second largest number of turns in the Embodiments 2 or 3, capacitors 10 may be connected to both the windings of the largest number and second largest number of turns.

Although the case using the force of wind has been explained, it is to be understood that hydraulic power may be used and the invention is applicable to a use employing hydraulic power in which the number of revolutions versus output characteristic for the maximum output is primarily determined upon the shape of a waterwheel being determined.

Moreover, while the invention has been explained with the three phases, single phase and other phases are also applicable.

Furthermore, although the first reactor 4 is connected to the alternating current output terminal W1 of the first winding in the embodiments shown in FIGS. 1 to 3, it is also possible to delete the first reactor by designing the permanent magnet type electric power generator 3 so that the required inductance value of the first reactor 4 becomes smaller.

The invention claimed is:

1. A main circuit of an electric power generating apparatus for dispersed power supply comprising a permanent magnet type electric power generator driven by a windmill or waterwheel driven at varying speeds by wind or water, and having
two windings, each of said two windings inducing different effective values of induced voltages,
alternating current outputs of said permanent magnet type electric power generator being rectified by individual rectifiers, and
direct current outputs of said individual rectifiers being summed up in parallel to output to an external,
wherein
a reactor is connected in series between a first individual rectifier and an alternating current output terminal of a first one of said two windings, said first winding inducing a lower effective value of induced voltage among said two windings, and
a capacitor is connected in series between a second individual rectifier and an alternating current output terminal of a second one two windings, said second winding inducing a higher effective value of induced voltage among said two windings,
in a manner that a sum of inductive impedance by internal inductance of the second winding and capacitive impedance by said capacitor is capacitive impedance having its absolute value being decreased at an increase of number of rotations of the windmill or waterwheel, within a range of rated rotational speed of said permanent magnet type electric power generator.

2. A main circuit of an electric power generating apparatus for dispersed power supply comprising a permanent magnet type electric power generator driven by a windmill or waterwheel driven at varying speeds by wind or water, and having two windings, each of said two windings inducing different effective values of induced voltages, alternating current outputs of said permanent magnet type electric power generator being rectified by individual rectifiers, and direct current outputs of said individual rectifiers being summed up in parallel to output to an external, wherein a reactor is connected in series between a first individual rectifier and an alternating current output terminal of a first one of said two windings, said first winding inducing a lower effective value of induced voltage among said two windings, and a capacitor is connected in series between a second individual rectifier and an alternating current output terminal of a second ones of said two windings, said second winding inducing a higher effective value of induced voltage among said two windings, in a manner that a sum of inductive impedance by internal inductance of the second winding and capacitive impedance by said capacitor is capacitive impedance having its absolute value being decreased at an increase of number of rotations of the windmill or waterwheel, within a range of rated rotational speed of said permanent magnet type electric power generator, so that said second winding enables output of alternating current substantially in proportion to a square of frequency in conjunction with increase in the induced voltage of the second winding.

* * * * *